Nov. 21, 1939.    S. BONZACK    2,181,008
BRAKE MECHANISM
Filed May 10, 1937    3 Sheets-Sheet 1

INVENTOR
STANLEY BONZACK
BY Whittemore Hulbert & Belknap
ATTORNEYS

Nov. 21, 1939.  S. BONZACK  2,181,008
BRAKE MECHANISM
Filed May 10, 1937  3 Sheets-Sheet 2
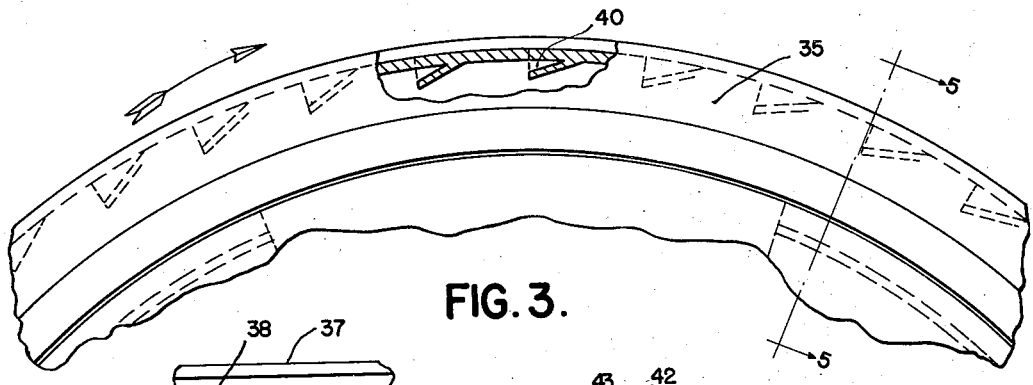
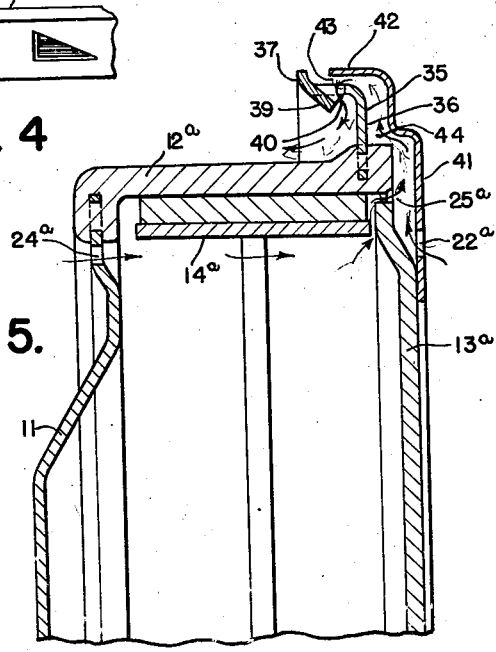
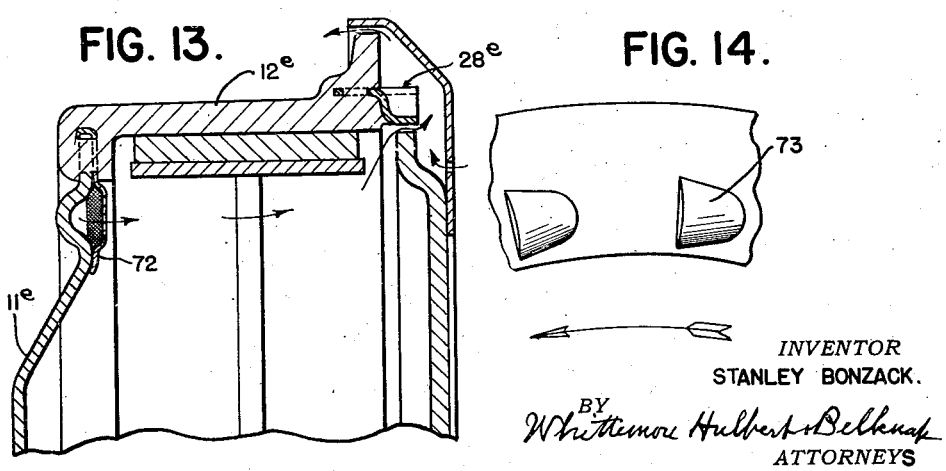
INVENTOR
STANLEY BONZACK.
BY
*Whittemore Hulbert Belknap*
ATTORNEYS Nov. 21, 1939.   S. BONZACK   2,181,008
BRAKE MECHANISM
Filed May 10, 1937   3 Sheets-Sheet 3
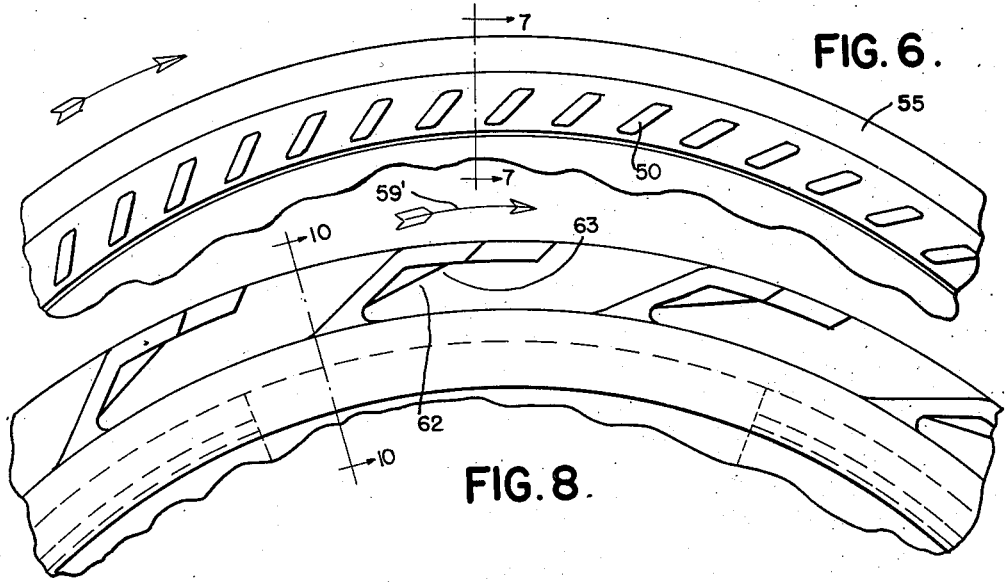
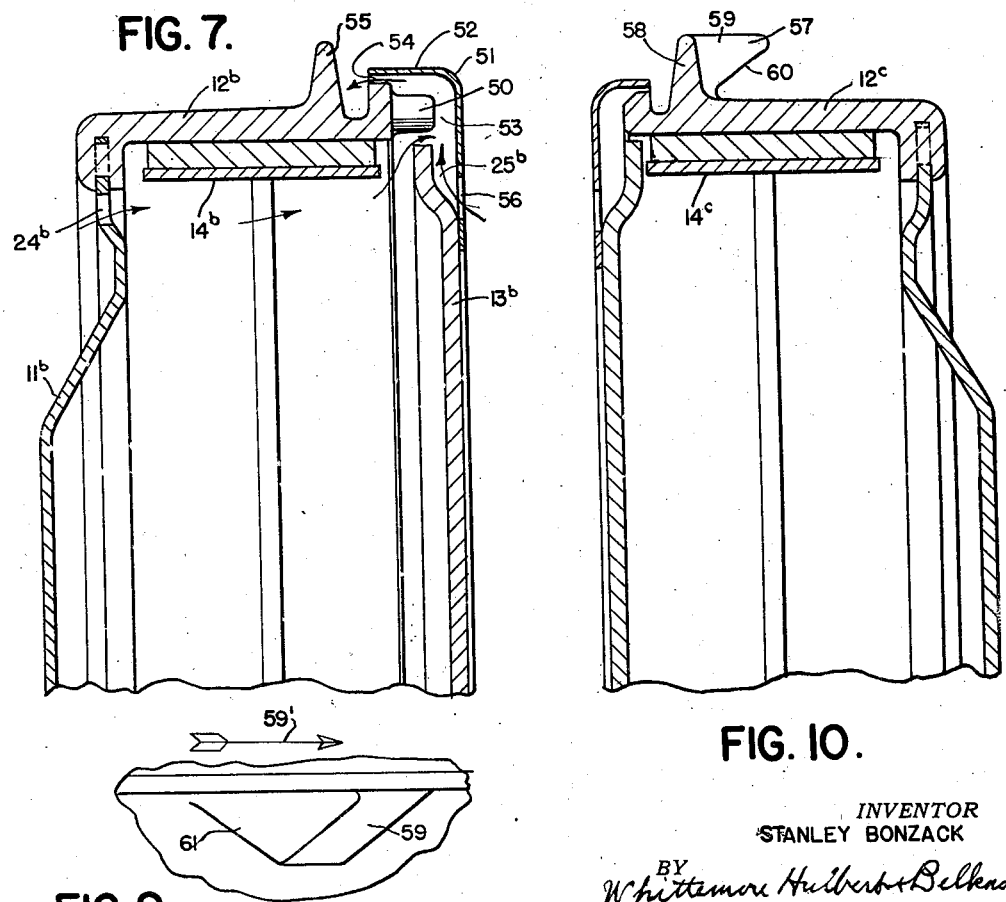
INVENTOR
STANLEY BONZACK
BY Whittemore Hulbert & Belknap
ATTORNEYS Patented Nov. 21, 1939

2,181,008

UNITED STATES PATENT OFFICE 2,181,008

BRAKE MECHANISM

Stanley Bonzack, Detroit, Mich., assignor to Kelsey-Hayes Wheel Company, Detroit, Mich., a corporation of Delaware Application May 10, 1937, Serial No. 141,827

27 Claims. (Cl. 188—264)

This invention relates generally to brake mechanism and refers more particularly to improved means for cooling the brake mechanism.

One of the principal objects of the present invention resides in the provision of brake mechanism comprising a brake drum having means effective upon rotation of the drum to cool the brake flange by directing air against a portion of the latter.

Another advantageous feature of the present invention resides in the provision of means revoluble with the brake drum and constructed to effect a circulation of air through the brake drum across the brake friction means to effectively cool both the friction means and the brake flange.

A further object of this invention resides in the provision of a brake drum having means effective upon rotation of the drum to draw air axially through the drum across the brake friction means and to direct air against the free edge portion of the brake flange. With this arrangement, the temperature within the drum is not only reduced, but the free edge portion of the brake flange is adequately cooled and, as a consequence, bell-mouthing of the brake flange due to expansion is minimized.

Still another object of the present invention resides in the provision of a brake drum of the character set forth in the preceding paragraph and embodying means for filtering the air passing into the brake drum in order to prevent dirt and foreign matter from accumulating in the drum.

A further advantageous feature of the present invention resides in the provision of a brake drum having openings through the web portion thereof for the passage of air into the drum and having means responsive to rotation of the drum in a forward direction to scoop air into the openings.

In addition to the foregoing, the present invention contemplates a brake drum having a cast brake flange and having means integral with the brake flange for effecting a circulation of air in proximity to the free edge of the brake flange to effectively cool the latter.

The foregoing, as well as other objects, will be made more apparent as this description proceeds, especially when considered in connection with the accompanying drawings, wherein:

Figure 3 is a rear elevational view of a modified form of brake drum;

Figure 4 is a fragmentary elevational view of the construction shown in Figure 3;

Figure 5 is a cross sectional view taken substantially on the plane indicated by the line 5—5 of Figure 3;

Figure 6 is a rear elevation of another embodiment of this invention having certain parts broken away for the sake of clearness;

Figure 7 is a cross sectional view taken on the plane indicated by the line 7—7 of Figure 6;

Figure 8 is a rear elevational view of a further embodiment of this invention having certain parts broken away for the sake of clearness;

Figure 9 is a fragmentary plan view of the construction shown in Figure 8;

Figure 10 is a cross sectional view taken substantially on the plane indicated by the line 10—10 of Figure 8;

Figure 13 is a fragmentary cross sectional view through a brake drum illustrating a further modification of this invention; and Figure 14 is a fragmentary elevational view of the construction shown in Figure 13.

Figure 1:
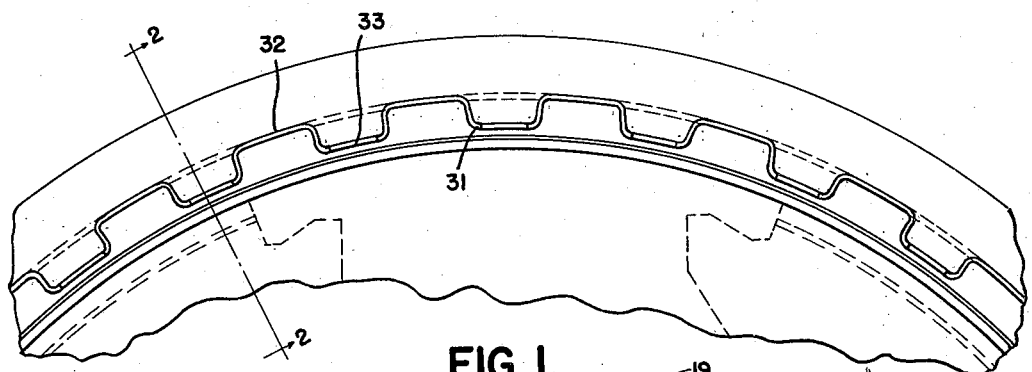
Figure 1 is a rear elevational view of a brake drum constructed in accordance with this invention.
Figure 2:
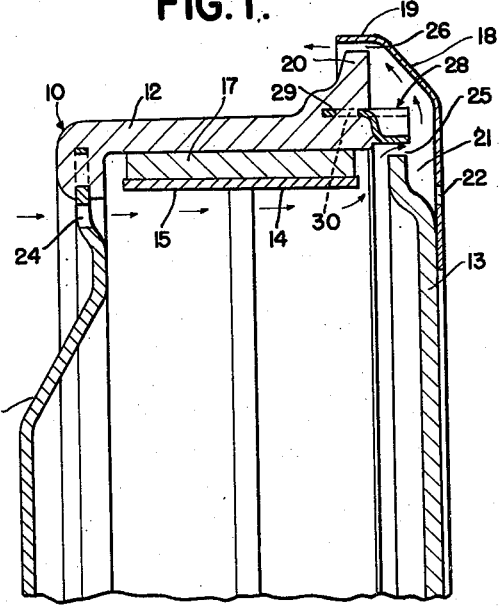
Figure 2 is a cross sectional view taken substantially on the plane indicated by the line 2—2 of Figure 1.

Referring first to the embodiment of the invention illustrated in Figures 1 and 2, it will be noted that the brake drum 10 is of the composite type having a sheet metal web 11 and having a brake engaging flange 12 cast integral with the periphery of the web 11. In accordance with conventional practice, the open side of the brake drum is closed by a backing plate 13 non-rotatably supported with respect to the brake drum 10 and carrying the brake friction means 14. Although the brake friction means 14 may be of any suitable construction insofar as the present invention is concerned, the same is shown herein as comprising two brake shoes 15 and 16 having brake linings 17 engageable with the inner surface of the annular brake flange 12.

Upon reference to Figure 2, it will be noted that a dust shield 18 is provided to prevent the entrance of foreign matter into the brake drum through the space occurring between the peripheral edge of the backing plate 13 and the free edge of the brake flange 12. In the present instance, the dust shield is formed of sheet metal and is welded, or otherwise permanently secured, to the outer surface of the backing plate 13 adjacent the periphery of the latter. The shield 18 is shown in Figure 2 as extending radially outwardly beyond the periphery of the backing plate 13 and as having an axially forwardly annular flange 19 overlying the radially outwardly extending reinforcing rib 20 at the free edge of the brake flange 12. It will also be noted from the above figure that the peripheral portion of the backing plate 13 radially outwardly beyond the point of securement of the dust shield with the backing plate is flared forwardly and cooperates with the dust shield 18 to form an annular recess 21. Any moisture or dirt entering the dust shield is collected by the recess 21 and is permitted to drain out of the latter through openings 22 formed in the dust shield at circumferentially spaced points adjacent the bottom of the recess 21.

In accordance with the present invention, the peripheral portion of the web 11 immediately adjacent the brake flange 12 is formed with a plurality of circumferentially spaced openings 24 therethrough, and provision is made for drawing air into the brake drum through these openings. As illustrated by the arrows in Figure 2, the air passing through the openings 24 is drawn across the brake friction means 14 and is discharged from the drum through the annular space 25 between the periphery of the backing plate 13 and the free edge of the brake flange 12. The air passing through the space 25 is directed by the dust shield 18 through the annular space 26 provided between the periphery of the rib 20 and the adjacent inner surface of the overlying peripheral flange 19 on the dust shield. It will, of course, be understood that as the air flows through the restricted annular space 26, the same comes into direct contact with the reinforcing rib 20 and thereby effectively cools the latter. As a consequence, any tendency for the free end of the brake flange 12 to expand due to heat is minimized and a true cylindrical braking surface is provided at all times.

In the present embodiment of the invention, circulation of air in the above manner is effected by means of a fan 28 positioned at the rear side of the brake flange 12 and having a forwardly extending annular flange 29 cast into the free or rear edge of the brake flange 12. In this connection, it will be noted that the annular flange 29 is formed with circumferentially spaced openings 30 therethrough to provide an interlocking connection between the flange 29 and the brake flange 12. The portion of the fan projecting rearwardly from the free edge of the brake flange 12 is formed with circumferentially spaced radially inwardly depressed portions 31 to provide blades 32 between adjacent depressed portions and the latter are apertured, as at 33, to permit the passage of air radially through the fan. It follows from the above that the fan is so constructed as to have a suction effect upon rotation of the brake drum 10, and this suction effect causes the circulation of air previously set forth. In other words, the suction effect of the fan draws air into the openings 24 in the web 11 of the brake drum across the brake friction means 14 and into the dust shield 18 through the space 25. As the air is discharged through the space 25, it passes radially outwardly through the fan and through the space 26 into contact with the reinforcing rib 20 at the free edge of the brake flange 12. It will, of course, be understood that air is drawn into the dust shield 18 through the openings 22, and this air mixes with the air entering the dust shield through the space 25 to supplement the same. As a result, the temperature within the brake drum is not only minimized, but the brake flange is maintained relatively cool, which is advantageous in that it reduces deformation of the cylindrical braking surface by heat.

The embodiment of the invention illustrated in Figures 3 to 5, inclusive, differs from the foregoing modification principally in the construction and location of the fan 35. In the present embodiment, the radially outwardly extending reinforcing rib 20 in the first described form of the invention is eliminated from the rear edge of the brake flange 12$^a$ and the fan 35 encircles the rear end of this latter flange. In the present instance, the fan 35 comprises a radially outwardly extending annular flange 36 having the radially inner edge cast integral with the brake flange 12$^a$ at the free, or rear edge, of the latter and having an axially forwardly extending annular flange 37 encircling the brake flange in spaced relation thereto. The flange 37 has circumferentially spaced triangular portions 38 stamped radially inwardly therefrom to form correspondingly shaped blades 39 and to provide openings 40 through the flange 37 for the passage of air.

The embodiment of the invention illustrated in Figures 3 to 5, inclusive, also comprises a dust shield 41 similar to the dust shield 18, with the exception that the forwardly extending peripheral flange 42 thereof overlies the rear end portion of the flange 37 and forms with the latter an annular air passage 43.

With the above construction, it will be noted that the fan 35 is effective upon rotation of the drum to draw air radially inwardly through the openings 40 in the flange 37 against the exterior surface of the brake flange 12$^a$. As the air flows radially inwardly through the openings 40 in the annular flange 37, it passes the annular space 43 and creates a suction in the space or chamber 44 sufficient to draw air through the openings 24$^a$ in the web 11$^a$ of the brake drum, across the brake friction means 14$^a$ into the chamber 44 through the annular space 25$^a$ existing between the peripheral edge of the backing plate 13$^a$ and the rear edge of the brake flange 12$^a$. Attention is also directed to the fact that the dust shield 41 is formed with a plurality of circumferentially spaced drain openings 22$^a$, and that the fan blades 39 will serve to draw a certain amount of air through the openings 22$^a$ into the chamber 44. This air co-mingles with the air discharged from the annular space 25$^a$ and supplements the latter. It follows, therefore, that the present embodiment of the invention also reduces the temperature within the brake drum and effectively cools the brake flange to prevent undue expansion of the latter by heat.

In the embodiment of the invention illustrated in Figures 6 and 7, a plurality of circumferentially spaced fan blades 50 are cast integral on the rear edge of the annular brake flange 12$^b$ of the brake drum. These blades extend axially rearwardly from the edge of the brake flange 12$^b$ and are obliquely arranged to draw air into the openings 24$^b$ in the web 11$^b$ of the brake drum across the brake friction means 14$^b$ through the annular space 25$^b$ provided between the periphery of the backing plate 13$^b$ and the rear edge of the brake flange 12$^b$. As will be observed from Figure 7, a dust shield 51 is permanently secured to the backing plate 13b and is provided with an axially forwardly extending flange 52 overlying the fan blades 50. Hence, the dust shield forms, in effect, a chamber 53 around the fan blades 50, and the air discharged into the chamber through the passage 25b is directed axially forwardly through the annular space 54 provided between the flange 52 on the dust shield and the rear edge of the brake flange 12b. This air is directed by the flange 52 against a radially outwardly extending reinforcing rib 55 on the brake flange 12b and serves to effectively cool the latter. It will also be noted that the dust shield is formed with drain openings 56, and that some air will be drawn through these drain openings by the fan blades 50 to supplement the air circulated through the brake drum.

In the construction shown in Figures 9 and 10, the fan blades 57 are cast integral with the radially outwardly extending reinforcing rib 58 on the rear edge portion of the brake flange 12c, and these blades extend axially forwardly from the front side of the annular rib 58. The forward direction of rotation of the brake drum is designated in Figures 8 and 9 by the arrow 59', and the blades 57 are shaped to direct air radially inwardly against the brake flange 12c to cool the later. In detail, it will be noted from Figure 10 that the top edges 59 of the blades 57 extend axially forwardly from the periphery of the rib 58 and terminate in a radially rearwardly inclined portion 60 connected into the brake flange 12c at the base of the rib 58. As shown in Figure 9, the blades are inclined from the rib 58 in a direction opposite the direction of rotation indicated by the arrows 59', and this top surface is connected to the rib by means of a rearwardly extending portion 61. The construction of the blades is shown in Figure 8 as being predetermined to form a pocket 62 facing the direction of forward rotation of the brake drum and having a radially inner surface 63 inclined to direct air against the brake flange 12c.

Figure 11:
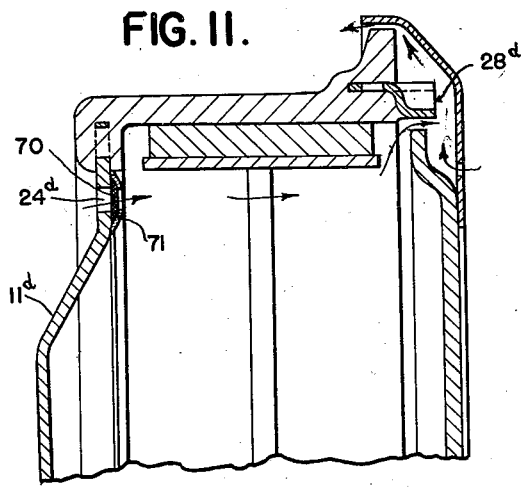
Figure 11 is a fragmentary sectional view of a brake drum showing still a further modification of the present invention.
Figure 12:
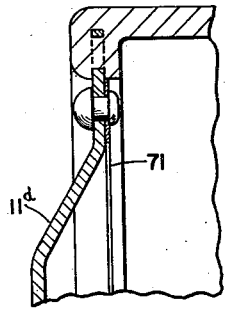
Figure 12 is a detailed sectional view of the construction shown in Figure 11.

The embodiment of the invention illustrated in Figures 11 and 12 differs from the modification of the invention disclosed in Figures 1 and 2 in that a filter 70 is associated with each of the openings 24d in the web 11d of the brake drum to prevent dirt, or other foreign matter, from being drawn into the brake drum by the fan means 28d on the free edge of the brake drum. The filtering means 70 is secured in place by a retainer 71 preferably formed of sheet metal and riveted, or otherwise permanently secured, to the inner surface of the web of the brake drum in the manner shown in Figure 12. It will, of course, be understood that the filter arrangement may be employed in connection with any one of the foregoing embodiments of the invention disclosing openings through the web of the brake drum for the passage of air into the drum.

The embodiment of the invention illustrated in Figures 13 and 14 differs from the one previously described in that the retainer 72 is cast with the web 11e integral with the brake flange 12e, and the web is formed with suitable scoops 73 facing the direction of forward rotation of the brake drum to collect air and direct the same into the brake drum through the openings in the web 11e. The scoops 73 are formed by severing the sheet metal web 11e at circumferentially spaced points and pressing the portions of the web 11e outwardly adjacent the severed portions to provide a pocket having the open end facing the direction of rotation. With this arrangement, a substantial volume of air is directed into the brake drum and is withdrawn from the brake drum by the fan means 28e in the same manner as described in connection with the first form of this invention.

Although several different embodiments of the invention have been described in detail herein, nevertheless, it will be noted that each embodiment contemplates fan means cast integral with the brake flange of a brake drum in such a position as to cause a circulation of air against a portion of the brake flange during rotation of the brake drum. Also in each instance, the air is more or less concentrated adjacent the free or rear edge portion of the brake flange to insure maintaining this portion sufficiently cool to prevent bellmouthing of the brake drum by excessive heat. It will further be apparent that in certain of the embodiments of the invention provision is made for filtering the air entering the brake drum through the web of the latter, and it will also be observed that in the last embodiment of the invention provision is made for actually scooping air into the brake drum as the latter is rotated in a forward direction. The scooping means may or may not be employed in connection with the fan means on the brake drum and reservation is made to make such changes in this or any of the other modifications that may come within the purview of the accompanying claims.

What I claim as my invention is:

1. In brake mechanism, a revoluble brake drum having an annular brake flange, and a plurality of circumferentially spaced fan blades rotatable as a unit with the drum and located axially beyond the free edge portion of the brake flange to direct air against the free edge portion of the brake flange.

2. In brake mechanism, a revoluble brake drum having a web provided with openings therethrough and having an annular brake flange extending axially from the periphery of the web, and means carried by the brake drum at the free edge of the brake flange and effective upon rotation of the latter to draw air into the drum through the openings in the web and to discharge the air against the free edge of the brake flange.

3. In brake mechanism, a revoluble brake drum having an annular brake flange, and circumferentially spaced fan blades permanently secured to and extending axially beyond the free edge of the annular brake flange to direct air against said flange.

4. In brake mechanism, a revoluble brake drum having a cast annular brake flange, and means cast integral with the free edge of the brake flange and effective upon rotation of the brake drum to direct air against said flange.

5. In brake mechanism, a revoluble brake drum having a web and having an annular brake flange extending axially from the periphery of the web, said brake flange provided with a radially outwardly extending reinforcing rib, and means mounted on the brake drum at the free edge of the brake flange for rotation therewith as a unit and effective to direct air against said reinforcing rib.

6. In brake mechanism, a revoluble brake drum having a web and having an annular cast brake flange extending axially from the web, and a member cast integral with the flange adjacent the free edge thereof and having a plurality of fan blades effective upon rotation of the drum to direct air against the free edge portion of the flange.

7. In brake mechanism, a revoluble brake drum having a cast annular brake flange, and a sheet metal member cast integral with the free edge of the brake flange and having a portion spaced radially outwardly from the brake flange provided with a plurality of circumferentially spaced blades effective upon rotation of the brake drum to direct air against said brake flange.

8. In brake mechanism, a revoluble brake drum having a web and having a cast annular brake flange extending axially from the web, a sheet metal member cast into the free edge of the brake flange and having an annular portion extending axially from the brake flange, said sheet metal member having circumferentially spaced apertured depressed portions and having blades between the depressed portions effective upon rotation of the drum to cause a circulation of air, and means cooperating with said blades to direct the air against the free edge portion of the brake flange.

9. In brake mechanism, a revoluble brake drum having a web and having an annular flange extending axially from the periphery of the web, a member permanently secured to the free edge of the brake flange and having an annular portion extending axially from said edge, said portion provided with a plurality of circumferentially spaced fan blades creating a circulation of air upon rotation of the drum, and means cooperating with said annular portion of the member to direct the air against said brake flange.

10. In brake mechanism, a revoluble brake drum having a web provided with openings therethrough and having an annular brake flange extending axially from the periphery of the web, a backing plate for the open end of the brake drum providing an annular space between the free edge of the brake flange and the periphery of said backing plate, a dust shield for said annular space secured to the backing plate and having a portion overlying the free edge of the brake flange in radial spaced relation thereto, and means carried by the brake drum at the free edge of the brake flange and effective upon rotation of the latter to draw air into the drum through the openings in said web and to effect a discharge of the air through the annular spaces provided at the periphery of the backing plate and at the periphery of the dust shield.

11. In brake mechanism, a revoluble brake drum having a web and having an annular flange extending axially from the periphery of the web, a backing plate for the open end of the drum having the periphery thereof spaced from the free edge of the brake flange to provide an annular passage, a dust shield secured to the backing plate and extending radially outwardly from the periphery of the backing plate beyond the free edge of the brake flange, said dust shield having a peripheral portion overlying the free edge of the brake flange in spaced relation thereto to form a second annular passage, and means at the free edge of the brake flange effective upon rotation of the drum to draw air into the space defined by the dust shield and to discharge this air through the annular space provided between the peripheral portion of the dust shield and the free edge of the brake flange.

12. In brake mechanism, a revoluble brake drum having a web and having an annular brake flange extending axially from the periphery of the web, a dust shield for the open end of the brake drum positioned axially beyond the free edge of the brake flange and extending radially outwardly from the brake flange, said dust shield having a peripheral portion overlying the free edge of the brake flange in spaced relation to the latter to provide a passage for air and having openings therethrough, and means effective upon rotation of the brake drum to draw air through said openings and to discharge this air through the passage provided at the peripheral portion aforesaid of the dust shield.

13. In brake mechanism, a revoluble brake drum having a web and having an annular brake flange extending axially from the periphery of the web, a backing plate at the open side of the drum and having the periphery thereof spaced from the free edge of the brake flange to form an annular passage, a dust shield secured to the backing plate in axial spaced relationship to the free edge of the brake flange and extending radially outwardly from the free edge of the brake flange, said dust shield having a peripheral portion overlying the free edge of the brake flange and providing an annular passage for air, and means revoluble with the brake drum and effective to draw air from the interior of the brake drum through the annular passage provided at the periphery of the backing plate and to discharge this air through the annular passage provided at the periphery of the dust shield.

14. In brake mechanism, a revoluble brake drum having a web provided with openings therethrough and having an annular brake flange extending axially from the periphery of the web, a backing plate at the open side of the brake drum and having the periphery thereof spaced from the free edge of the brake flange to form an annular passage, a dust shield secured to the backing plate and extending radially outwardly beyond the free edge of the brake flange in axial spaced relation to said edge, said dust shield having a peripheral portion overlying the free edge of the brake flange providing a passage for air, and a fan at the free edge of the brake drum revoluble with the latter and predeterminedly positioned to draw air into the brake drum through the openings in the web and to discharge the air through the annular passage at the periphery of the backing plate around the free edge of the brake flange and through the annular passage at the periphery of the dust shield.

15. In brake mechanism, a revoluble brake drum having an annular brake flange, an annular member secured to the free edge of the brake flange and extending radially outwardly from the latter, said member having an axially extending portion at the periphery thereof provided with openings therethrough and having circumferentially spaced fan blades effective upon rotation of the drum to draw air through the openings into engagement with the brake flange.

16. In brake mechanism, a revoluble brake drum having an annular brake flange, an annular member secured to the brake flange adjacent the free edge thereof and extending radially outwardly from the brake flange, said annular member having an axially extending annular flange at the periphery thereof provided with circumferentially spaced openings therethrough and having fan blades effective upon rotation of the drum to draw air through the openings toward the brake flange, and means cooperating with the annular member to form a passage communicating with the interior of the brake drum and predeterminedly positioned with respect to the path of travel of the air through the openings in the axially extending portion of the member to create a suction effect in the passage by the air drawn through the openings by the fan blades.

17. In brake mechanism, a revoluble brake drum having an opening through a portion thereof for the passage of air into the drum, means carried by the drum for filtering the air entering the drum through said opening, and means effective upon rotation of the drum in one direction to scoop air through said opening into the drum.

18. In brake mechanism, a revoluble brake drum having a web portion provided with openings therethrough adjacent the periphery thereof for the passage of air into the drum, means effective upon rotation of the drum in one direction to direct air through the openings, and means also effective upon rotation of the drum in said direction to draw air through said openings.

19. In brake mechanism, a revoluble brake drum having a web provided with openings therethrough adjacent the periphery thereof and having a brake flange extending axially from the periphery of the web, means carried by the drum at the free edge of the brake flange and effective upon rotation of the drum in one direction to draw air into the drum through said openings in the web, and means for filtering the air passing through said openings.

20. In brake mechanism, a revoluble brake drum having a web provided with openings therethrough adjacent the periphery thereof and having an annular cast brake flange extending axially from the web, means effective upon rotation of the drum in one direction to cause air to flow through the openings into the drum, a filtering material associated with the openings to filter the air flowing through said openings into the drum, and a retainer for the filtering material cast integral with the brake flange.

21. In brake mechanism, a revoluble brake drum having an annular cast brake flange, a web for the drum cast integral with the flange and having an opening therethrough for the passage of air into the drum, filtering material associated with the opening to filter the air passing through the opening into the drum, and a retainer for the filtering material cast with said web integral with the brake flange.

22. In brake mechanism, a revoluble brake drum provided with a web having circumferentially spaced portions adjacent the periphery thereof displaced axially outwardly and apertured to provide for the flow of air into the drum upon rotation of the latter in one direction, and means for filtering the air passing into the drum through said openings.

23. In brake mechanism, a revoluble brake drum having a web provided with openings therethrough and having an annular brake flange extending axially from the periphery of the web, and projections spaced from each other circumferentially of the brake flange and extending axially from the free edge of the flange to cooperate with each other upon rotation of the brake drum to draw air into the drum through said openings.

24. In brake mechanism, a revoluble brake drum having a web and having a cast annular brake flange extending axially from the web, a sheet metal member cast into the brake flange and having an annular portion extending axially from the brake flange, said sheet metal member having circumferentially spaced depressed portions providing blades effective upon rotation of the drum to cause a circulation of air, and means cooperating with the blades to direct the air against the brake flange.

25. In brake mechanism, a revoluble brake drum having a web provided with openings therethrough and having an annular brake flange extending axially from the periphery of the web, closure means for the open end of the brake drum having a portion overlying the free edge of the brake flange and cooperating with the brake flange to form an annular space, and means carried by the brake drum at the free edge of the brake flange and effective upon rotation of the latter to draw air into the drum through the openings in said web and to discharge the air through said annular space against the brake flange.

26. In brake mechanism, a revoluble brake drum having a web provided with openings therethrough and having an annular brake flange extending axially from the periphery of the web, closure means for the open end of the drum having a portion cooperating with the free edge portion of the brake flange to form an annular space and having an axially extending portion overlying the free edge portion of the brake flange providing an additional annular space, and means located between the annular spaces aforesaid and effective upon rotation of the drum to draw air through the opening in the web of the brake drum and through the first mentioned annular space and to discharge the air through the second mentioned annular space against the exterior surface of the brake flange.

27. In brake mechanism, a revoluble brake drum having a web provided with openings therethrough and having an annular brake flange extending axially from the web, closure means for the open end of the brake drum forming an annular chamber axially beyond the free edge of the brake flange, said chamber having the radially outer wall extending axially of the brake flange and overlying the free edge portion of said flange, and means rotatable with the brake drum within said chamber and effective to draw air through the drum from the openings in the web into the chamber and to discharge the air from the chamber against the exterior surface of the brake flange.

STANLEY BONZACK.